United States Patent
Starbuck et al.

(10) Patent No.: US 8,161,022 B2
(45) Date of Patent: Apr. 17, 2012

(54) EFFICIENTLY AND RELIABLY PROVIDING MESSAGE RELATED DATA

(75) Inventors: Bryan T. Starbuck, Redmond, WA (US); Gail Borod Giacobbe, Seattle, WA (US); Alexander E. Vaschillo, Redmond, WA (US); Stephen T. Wells, Seattle, WA (US); Robert C. Combs, Redmond, WA (US); Sridhar Sundararaman, Bellevue, WA (US); Raghavendra Rachamadugu, Hyderabad (IN); Hubert Louis Marie Van Hoof, Seattle, WA (US); John Heinrich Lueders, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 533 days.

(21) Appl. No.: 12/102,375

(22) Filed: Apr. 14, 2008

(65) Prior Publication Data

US 2008/0189244 A1    Aug. 7, 2008

Related U.S. Application Data

(62) Division of application No. 10/691,855, filed on Oct. 23, 2003, now Pat. No. 7,370,052.

(51) Int. Cl.
*G06F 17/30* (2006.01)
(52) U.S. Cl. .................................... 707/705
(58) Field of Classification Search .................. None
See application file for complete search history.

(56) References Cited

U.S. PATENT DOCUMENTS

| | | | |
|---|---|---|---|
| 6,424,995 B1 | 7/2002 | Shuman | |
| 6,708,202 B1 | 3/2004 | Shuman | |
| 6,708,205 B2 | 3/2004 | Sheldon | |
| 7,007,041 B2 | 2/2006 | Multer | |
| 7,370,052 B2 | 5/2008 | Starbuck | |
| 2002/0049816 A1* | 4/2002 | Costin et al. | 709/206 |
| 2002/0099777 A1* | 7/2002 | Gupta et al. | 709/206 |
| 2003/0097361 A1* | 5/2003 | Huang et al. | 707/10 |

OTHER PUBLICATIONS

Office Action mailed Sep. 22, 2006 cited in U.S. Appl. No. 10/691,855.
Office Action mailed Mar. 14, 2007 cited in U.S. Appl. No. 10/691,855.
Office Action mailed Jul. 30, 2007 cited in U.S. Appl. No. 10/691,855.
Notice of Allowance mailed Jan. 25, 2008 in U.S. Appl. No. 10/691,855.

* cited by examiner

*Primary Examiner* — Belinda Xue
(74) *Attorney, Agent, or Firm* — Workman Nydegger (57) ABSTRACT

The principles of the present invention extend to efficiently and reliably providing message related data. Generally, data fields of electronic messages and attachments are created in accordance with an electronic message schema hierarchy. An electronic message can include links to folder items that represent message folders. An electronic message can also include links to contact items that represent message participants. Message applications can register for folder spaces such that each message application is aware of folders that are primarily controlled by other message applications. A link to a contact item can be selected to access current contact related data for a message participant, even when the contact related data has changed since an electronic message containing the link was received.

16 Claims, 5 Drawing Sheets

EFFICIENTLY AND RELIABLY PROVIDING MESSAGE RELATED DATA

CROSS REFERENCE TO RELATED APPLICATIONS

This application is a divisional of U.S. patent application Ser. No. 10/691,855, filed Oct. 23, 2003 now U.S. Pat. No. 7,370,052, entitled "EFFICIENTLY AND RELIABLY PROVIDING MESSAGE RELATED DATA."

BACKGROUND OF THE INVENTION

1. The Field of the Invention

The present invention relates to electronic messaging and, more particularly, to efficiently and reliably providing message related data.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, web browsing) include electronic communication between a number of computer systems and/or other electronic devices via wired and/or wireless computer networks.

In particular, electronic messaging has become an important method for communicating. Computer system users often send and receive electronic messages (e.g., electronic mail messages, instant messages, faxes, news group postings, etc.) to exchange information with one another. For example, to send an electronic mail message, a sending user typically selects a new message option from within an electronic mail application. In response to the selection, the electronic mail application displays one or more fields (e.g., a To field, a Body field, etc.) that can receive user entered data. The sending user then enters data (e.g., at a keyboard) into the displayed fields. When appropriate, the sending user can save the electronic mail message as a draft or send the electronic mail message to a recipient user (e.g., by selecting the appropriate "save" or "send" control within the electronic mail application).

Sending the electronic mail message may cause the electronic mail message to be routed from the sending user's computer system, through a sending mail server, across a network, to a receiving mail server that stores electronic mail messages for a recipient user. To view the electronic mail message, the recipient user establishes a connection from an electronic mail application to the receiving mail server. Establishing the connection can cause all electronic mail messages sent to the recipient user, including the mail message from the sending user, to be transferred from the receiving mail server to the recipient user's computer system and stored at the recipient user's computer system. After the electronic mail message from the sending user is transferred and stored, the recipient user may manipulate an input device, such as, for example, a mouse, within the electronic mail application to view the stored electronic mail message.

Computer system users can also use other different messaging applications to send, receive, and store other different types of electronic messages. Unfortunately, different types of electronic messages (e.g., electronic mail messages, instant messages, faxes, blog entries, voice messages, etc.) are typically stored in different data formats. For example, a data format used to store one type of electronic message, such as, for example, an instant message, typically differs from the data format used to store other different types of electronic message, such as, for example, a news group posting. Thus, to access a specified type of electronic message, a user is required to use a messaging application that can access data stored in the data format corresponding to the specified type of electronic message. For example, a user is typically required to use an instant messaging application to access instant messages.

Further, messaging applications are typically configured to access only a few, or even only one, type of electronic message and cannot generally be used to access other additional types of electronic messages. That is, messaging applications are typically designed to access data stored in a limited number of data formats, and potentially only one data format, that corresponds to one or more specified electronic message types. For example, an instant message application is typically configured to access data stored in one or more instant message data formats but is typically not configured to access data stored in fax data formats.

Additionally, some data formats can be application specific. Thus, two messaging applications configured to access the same type of electronic messages may nonetheless use different data formats to store electronic message data. For example, a first electronic mail application may store electronic mail messages using a first data format, while a second electronic mail application stores electronic mail messages using a second different data format. Thus, a messaging application developed to access electronic messages of a particular type may not be able to access all electronic messages of the particular type. For example, an electronic mail message stored in the first data format by the first electronic mail application may not be accessible to the second electronic mail application (e.g., that can only access electronic mail messages stored in the second data format).

Also, each different messaging application typically stores corresponding electronic messages in a different database. For example, an instant messaging application can store instant messages in an instant messaging database, an electronic mail application can store electronic mail messages in an instant messaging database, a news group reader can store news group postings in a news group database, etc. Accordingly, some limited attempts to simplify message access have been developed.

For example, Message Application Program Interface ("MAPI") allows different electronic mail applications to interoperate to distribute electronic mail messages. MAPI essentially functions as converter that allows electronic mail applications to exchange messages even if native message formats of the electronic mail applications differ. That is, an electronic mail message in a first format can be configured for MAPI compatibility, transferred to another database, received through MAPI, and configured for compatibility with a second format. However, interoperability is typically restricted to electronic mail applications that implement MAPI to exchange electronic mail messages. That is, MAPI would typically not be used to exchange other types of electronic messages, such as, for instant messages, faxes, etc. The restrictions of MAPI prevent many message applications from compatibly accessing electronic messages and thus being able to interoperate to exchange electronic messages with other messaging applications.

A further deficiency in many electronic messaging applications is the inability to provide accurate contact information related to an entity associated with an electronic message. For example, a received electronic message may only include an e-mail address of a sending entity. Thus, there may be no way for a message recipient to respond to a sending entity other than through e-mail. Further, even if a sending entity is included in a message recipient's address book there is always some chance that the sending entity's contact information has change (e.g., new telephone number, address, job title, etc.). Also, since an address book is typically stored at a message recipient's computer system and is updated only when the message recipient expressly enters data, there is no way for the address book to be updated to provide potentially real-time contact information. For example, there is no way for a message recipient to determine if a sending entity is in the office, at lunch, etc. Therefore systems, methods, computer program products, and data structures for efficiently and reliably providing message related data would be advantageous.

BRIEF SUMMARY OF THE INVENTION

The foregoing problems with the prior state of the art are overcome by the principles of the present invention, which are directed towards methods, systems, computer program products, and data structures for efficiently and reliably providing message related data. Generally, data fields of electronic messages and attachments are created in accordance with an electronic message schema hierarchy. Different types of messages, such as, for example, electronic mail messages, instants messages, fax messages, etc, can be stored in a common message silo. The common messaging silo is generally accessible to a number of different message applications such that each of the different message applications can retrieve and store electronic messages.

Electronic messages can include links to folders included in a folder silo and contacts included in a contacts silo. A link to folder can represent that an electronic message is stored in the folder. A link to a contact can represent a relationship to contact related data. A link to a contact can be presented, for example, as an icon or hyperlink, at a user-interface. The icon or hyperlink can be selected to provide contact related data from an electronic message participant.

An operating system can maintain registration data indicating which message applications have primary control over specified message folders. When a new message application is to utilize the message silo (e.g., to store and access electronic messages), the new message application can attempt to register for a folder space within the folder silo. Accordingly, the new message application sends a registration request to the operating system. The registration request can request that a folder space be allocated to the new message application.

The operating system receives the folder registration request from the new message application. The operating system determines that the folder silo has resources for satisfying the folder registration request. For example, the operating system can check the registration data and determine that the requested folder space is not allocated to another message application. The operating system allocates the folder space to the new message application to satisfy the registration request.

The operating system maintains an indication that the new message application has primary control over the allocated folder space. Thus, other message applications can be made aware that the new message application has primarily control over electronic messages within the allocated folder space. Accordingly, the likelihood of a message application inappropriately altering message related data primary controlled by another message application is reduced.

In some embodiments, a computer system receives an electronic message that has one or more message participants. Subsequent to receiving the electric message, the computer system selects a link to a contact item representing one of the message participants. The computer system receives contact related data associated with the selected participant (e.g., from a contacts silo). Thus, even when contact related data associated with a participant changes (e.g., after an electronic message is received) the computer system is still able to access the current contact related data. Further, the computer system may be able to access more detailed contact related data in response to selecting a participant identifier, such as, for example, an electronic mail address.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention provide for efficiently and reliably providing message related data. Generally, data fields of electronic messages and attachments are created in accordance with an electronic message schema hierarchy. An electronic message can include links to folder items that represent message folders. An electronic message can also include links to contact items that represent message participants. Message applications can register for folder spaces such that each message application is aware of folders that are primarily controlled by other message applications. A link to a contact item can be selected to access current contact related data for a message participant, even when the contact related data has changed since an electronic message containing the link was received.

Generally, data fields of electronic messages and attachments are created in accordance with an electronic message schema hierarchy. An electronic message can include links to folder items that represent message folders. An electronic message can also include links to contact items that represent message participants. Message applications can register for folder spaces such that each message application is aware of folders that are primarily controlled by other message applications. A link to a contact item can be selected to access current contact related data for a message participant, even when the contact related data has changed since an electronic message containing the link was received.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

In this description and in the following claims, a "schema" is defined as an expression of a shared vocabulary between a plurality of computer systems that allows the plurality of computer systems to process documents according the expressed shared vocabulary. For example, an eXtensible Markup Language ("XML") schema can define and describe a class of XML documents using schema constructs (e.g., name/value pairs) of an XML schema language. These schema constructs can be used to constrain and document the meaning, usage, and relationships of data types, elements and their content, attributes and their values, entities and their contents, and notations, as used in XML documents. Thus, any computer system that can access an XML schema can process XML documents in accordance with the XML schema. Further, any computer system that can access an XML schema can compose or modify XML documents for use by other computer systems and/or message processors that can also access the XML schema.

Schema is defined to include Document Type Definitions ("DTD"), such as, for example, DTD files ending with a ".dtd" extension. Schema is also defined to include World Wide Web Consortium ("W3C") XML Schemas, such as, for example, XML Schema files ending with a ".xsd" extension. However, the actually file extension for a particular DTD or XML schema is not important. A schema can be utilized to define virtually any data type including logical, binary, octal, decimal, hexadecimal, integer, floating-point, character, character string, user-defined data types, and combinations of these data types used to defined data structures. Some examples of user-defined data types are DateTime data types representing date and time data and EAddress data types representing electronic addresses data, such as, for example, telephone numbers, electronic mail address, instant message addresses, etc., A schema can also be defined to reference or link to other schemas in a schema hierarchy.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
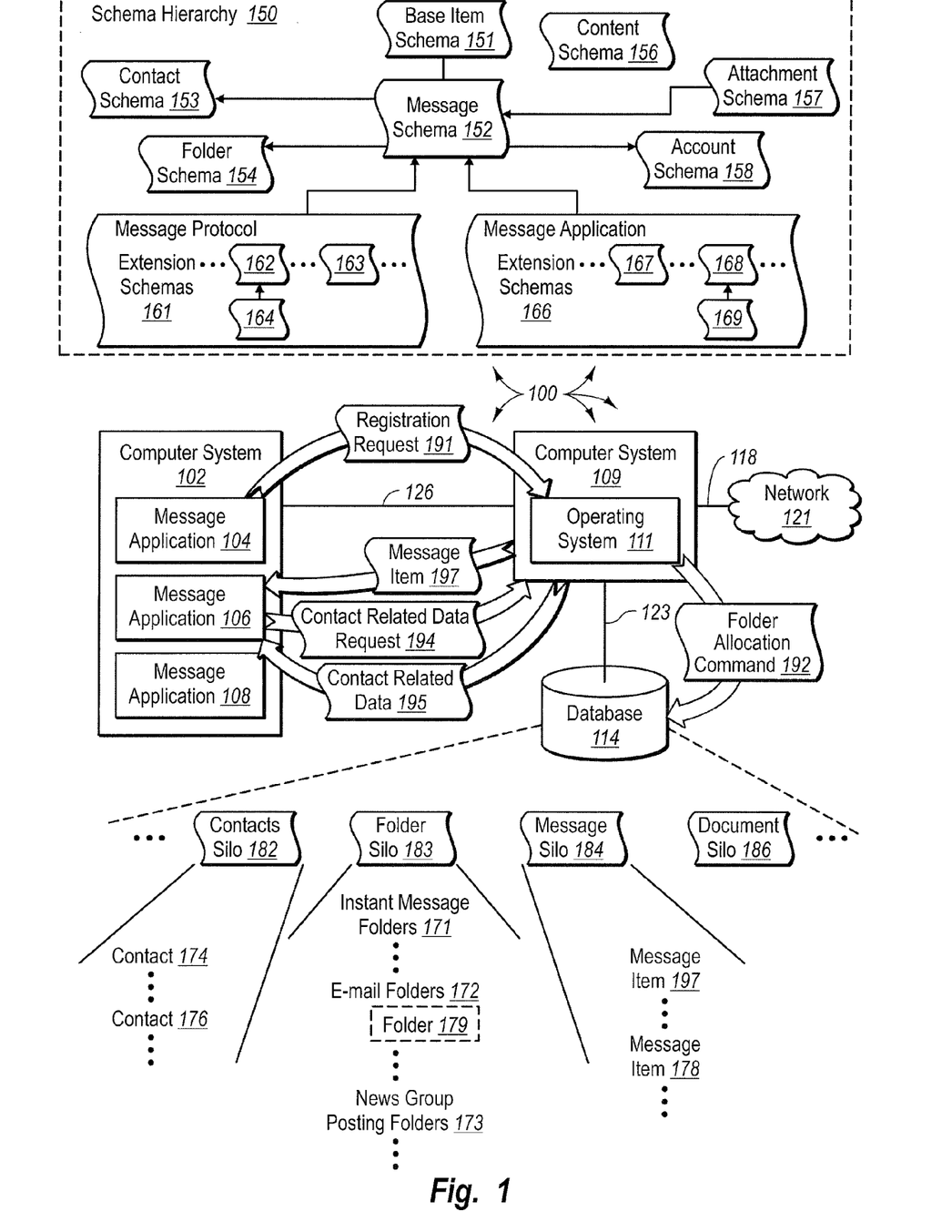
FIG. 1 illustrates an example of a network architecture and general schema hierarchy that facilitate efficiently and reliably providing message related data in accordance with the principles of the presenting invention.

FIG. 1 illustrates an example of a network architecture 100 and general schema hierarchy 150 that facilitate efficiently and reliably accessing message related data. Network architecture 100 includes computer system 102, computer system 109, database 114, and network 121. Computer system 102 and computer system 109 are connected by corresponding link 126. Computer system 102 and computer system 109 can exchange electronic messages (e.g., electronic mail messages, instant messages, fax messages, news group postings, voice messages, etc.) and other message related data (e.g., message folder data and message participant data) over link 126. For example, it may be that computer system 109 is a messaging server that stores electronic messages. From time to time computer system 102 may connect to computer system 109 to download electronic messages.

Computer system 109 is connected to database 114 by link 123. Database 114 can be a database that stores a plurality of different types of database items. For example, contacts silo 183 can store contact items, such as, for example, contact items 174 and 176, representing contacts (e.g., individual, organizations, or corporations), folder silo 183 can store folder items representing folders, such as, for example, instant message folders 171, e-mail folders 172, and news group posting folders 173, that store other types of items (e.g., electronic messages), message silo 184 can store message items, such as, for example, message items 197 and 178, representing electronic messages, document silo 186 can store document items representing various documents, etc. Database items stored in database 114 can include data fields defined in accordance with the schemas of schema hierarchy 150. A series of three periods (an ellipsis) before contacts silo 182 and after documents silo 186 indicates that other silos (potentially storing other different types database items) can be included in database 114.

Computer system 109 is connected to network 121 by link 118. Network 121 can be a Local Area Network ("LAN"), Wide Area Network ("WAN"), or even the Internet. Computer system 109 can receive data from and send data to other computer systems connected to network 121 over link 118. Computer system 102, computer system 109, and possibly other computer systems connected to network 121 can have access to schemas included in schema hierarchy 150.

Schema hierarchy 150 generally represents data formats for defining message items and related items, such as, for example, folder items and contact items. Message items representing electronic messages (as well as other types of items in database 114) can be defined in accordance with base item schema 151. Generally, a base item schema can define data formats for data fields (e.g., a globally unique ID and display name) used to differentiate one database item from another database item. Accordingly, message items stored in message silo 184 (as well as items stored contacts silo 182, folder silo 183, and document silo 186) can include one or more data fields defined in accordance with base item schema 151.

Message schema 152 defines data formats for one or more data fields (e.g., message subject, message size, etc.) that are common to a plurality of different types of electronic messages (e.g., electronic mail message, instant message, news group posting, blog entry, fax message, voice mail message, etc). Accordingly, message items stored in message silo 184 can include one or more data fields defined in accordance with message schema 152. Message schema 152 can define data fields that refer or linked to data fields defined in accordance with other schemas in schema hierarchy 150.

For example, message schema 152 can define one or more data fields that refer or link to contact related data (having data fields defined in accordance with contact schema 153) in contacts silo 182. Accordingly, a message item defined in accordance with message schema 152 can refer or link to contacts related information in silo 182. Referring to or linking to contact related information can indicate that the entity corresponding to the contact related data is an electronic message participant. Similarly, message schema 152 can define one or more data fields that refer or link to a folder related data (having data fields defined in accordance with contact schema 153) in folders silo 183. Accordingly, a message item defined in accordance with message schema 152 can also refer or link to folder related data in folder silo 183. Referring to or linking to a folder related data can indicate that the message item is stored in a folder corresponding to the folder related data.

Likewise, message schema 152 can define one or more data fields that refer to link to document related data. Accordingly, a message item defined in accordance with schema 152 can include one or more attachments (having data fields defined in accordance with attachment schema 157) that refer to link to document related data in document silo 186. Referring to or linking to document related data can indicate that the document corresponding to the document related data was an attachment to the message item. Further, a message item defined in accordance with message schema 152 can refer or link to account related data defined in accordance with account schema 158. The content of a message item (e.g. a message body or message attachment) can include data fields defined in accordance with content schema 156

A message item defined in accordance with schema 152 can also include data fields defined in accordance with one or more message extensions schemas. Some message extension schemas can be protocol extensions that promote compatibility with specified message protocols. For example, message protocol extension schemas 161 can contain one or more message protocol extension schemas defining data fields that are specific to particular message protocols. For example, protocol extension schema 162 can define data formats for one or more data fields specific to a first message protocol (e.g., Network News Transfer Protocol ("NTTP")) and protocol extension schema 163 can define data formats for one or more data fields specific to a second message protocol (e.g., Post Office Protocol 3 ("POP3")). Protocol extension schemas can be arranged hierarchy. For example, protocol extension schema 164 can define data formats for additional data fields specific to a particular implementation of the first message protocol (having data fields defined in accordance with protocol extension schema 162).

Other message extensions can be application extensions that promote compatibility with specified message applications. For example, message application extension schemas 166 can contain one or more message application extension schemas defining data fields that are specific to message applications. For example, application extension schema 167 can define data formats for one or more data fields specific to a message application 104 and application extension protocol schema 168 can define data formats for one or more data fields specific to message application 106. Application extension schemas can be arranged hierarchy. For example, application extension schema 169 can define data formats for additional data fields specific to a particular version of message application 106 (having data fields defined in accordance with application extension schema 168).

Accordingly, an electronic message can have some fields in common with other electronic messages and some fields that differ from other electronic messages. That is, a message item having data fields defined in accordance with message schema 152 can also have additional data fields defined in accordance with any of the extension schemas in message protocol extension schemas 161 and message application extension schemas 166. Data fields corresponding to message extensions can be "snapped" on to and removed from message items as appropriate to facilitate compatibility with existing message protocols and message applications. Accordingly, the configuration of data fields contained in a message item can change over time. Having some commonly defined fields and other differently defined fields promotes efficient storage and access of electronic messages, while also facilitating message compatibility with existing message protocols and message applications.

An operating system, such as, for example, operating system 111, may request that data fields of a particular protocol extension schema or application extension schema be snapped on to or removed from a message item before accessing the message item. Thus, it may be that a message item is transformed for compatibility with a particular message protocol or message application. For example, application 111 may request that fields of the NNTP protocol extension schema be snapped onto message item 197. Accordingly, operating system 111 can retrieve message item 197 and transform message item 197 to include data fields (e.g., defined in accordance with protocol extension schema 162) that promote compatibly with the NNTP protocol. The transformed message item can then be transferred to computer system 102 or stored in database 114.

Figure 2:
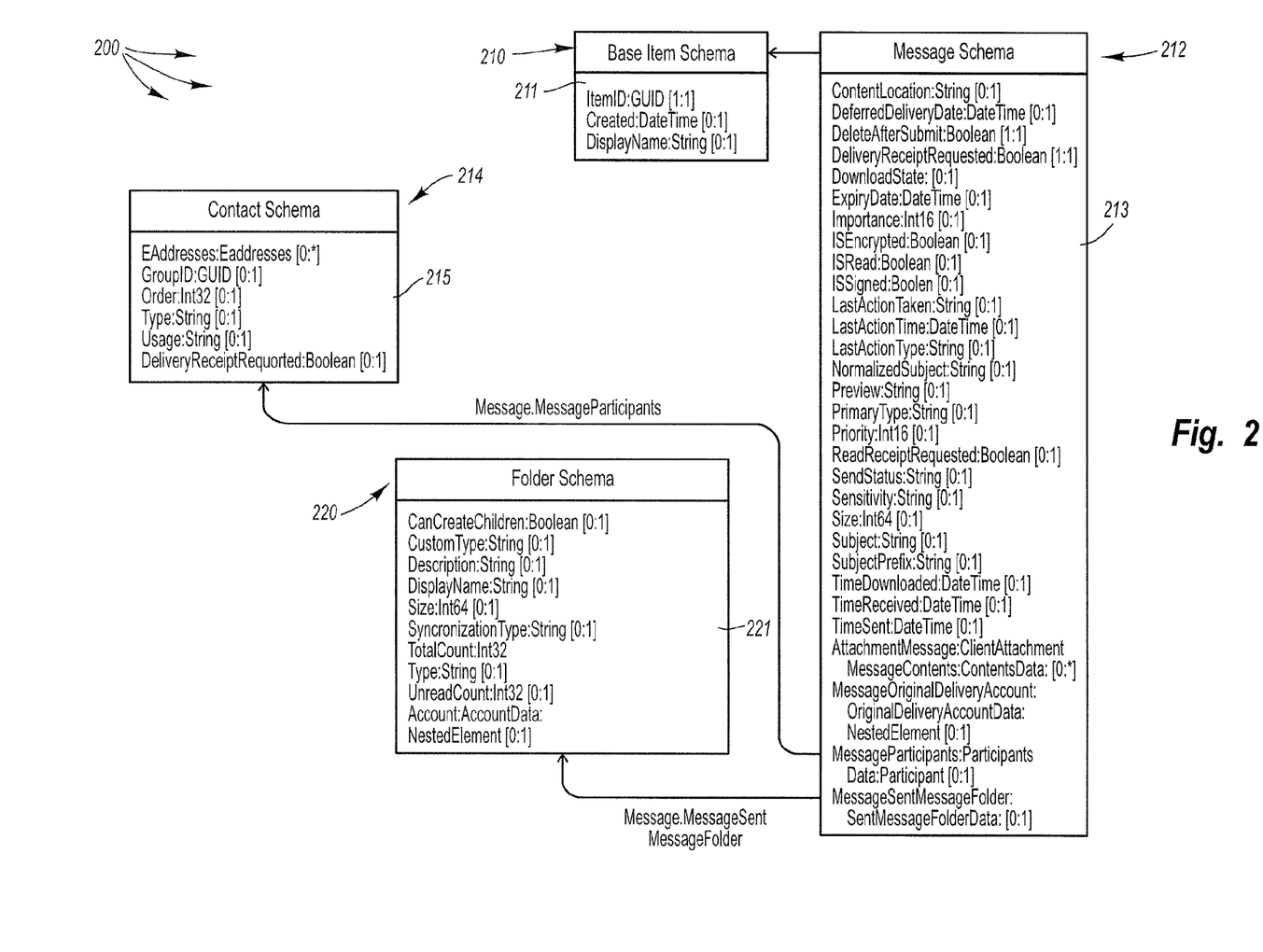
FIG. 2 illustrates an example portion of a more detailed schema hierarchy in accordance with the principles of the present invention.

FIG. 2 illustrate an example portion of a more detailed schema hierarchy 200 in accordance with the principles of the present invention. Depicted in FIG. 2, schema hierarchy 200 includes base item schema 210. Base item schema 210 includes interrelated fields 211 that define data formats for representing base item data. More specifically, interrelated fields 211 can define data formats as described in Table 1.

TABLE 1

| Field Name | Field Data Type | Field Description |
| --- | --- | --- |
| ItemID | GUID | Defines a format for representing a globally unique identifier for a database item. |
| Created | DateTime | Defines a format for indicating the date and time a database item, having a globally unique identifier defined in accordance with the ItemID field, was created. |
| DisplayName | String | Defines a format for indicating a descriptive name for a database item having a globally unique identifier defined in accordance with the ItemID. |

Depicted in FIG. 2, schema hierarchy 200 includes message schema 212. Message schema 212 derives from base item schema 210 and also includes interrelated fields 213 that define data formats for representing a message item. The fields of message schema 212 can be applied to a base item having a globally unique identifier (defined in base item schema 210) to cause the base item to exhibit the properties of a message item. More specifically, interrelated fields 213 can define data formats as described in Table 2.

TABLE 2

| Field Name | Field Data Type | Field Description |
| --- | --- | --- |
| ContentLocation | String | Defines a format for representing referenced content from a message's Content-Location header. This field can be used along with the base Content-Location. Some attachments will have relative Content-Locations to this Content-Location. |
| DeferredSendTime | DateTime | Defines a format for representing the date and time when the message is to be delivered. |
| DeleteAfterSubmnit | Booelan | Defines a format for indicating whether the message should be deleted after being submitted for delivery. |
| DownloadState | String | Defines a format for representing the different phases of downloading the message from the server. Partial, etc. |
| ExpiryDate | DateTime | Defines a format for representing the date and time when the content of the message expires. In general, no automatic action is implied. |
| Importance | Int16 | Defines a format for representing the message sender's opinion of the importance of the message. Corresponds with the "Importance:" field in SMTP. Possible values are 1 ("Low"), 2 ("Normal"), and 3 ("High"). The default value for new messages is 2 ("Normal"). |
| IsEncrypted | Boolean | Defines a format for indicating if the message is encrypted. |
| IsRead | Boolean | Defines a format for indicating if the message has been marked as read by the user. |
| IsSigned | Boolean | Defines a format for indicating if the message has been signed. |
| LastActionTaken | String | Defines a format for representing the last action taken on the message. Possible values are: Replied and Forwarded. |
| LastActionTime | DateTime | Defines a format for representing the date and time at which the last action was taken on the message. |
| LastActionType | String | Defines a format for representing the type of last action taken on this message. Should be interpreted together with LastActionTaken. Examples are: Fax or Email to mark that we replied by fax or email. |
| NormalizedSubjet | String | Defines a format for representing the normalized subject of the message. The NormalizedSubject is the part the subject following the prefix. If there is no prefix, NormalizedSubject is the same as the subject. |
| Preview | String | Defines a format for representing a preview of the message. The preview property can contain the first few characters of the main message body, or some representation of it that will be used for previewing the message. This is cache-optimization field. It is calculated form the bodies and is put here for fast retrieval in preview scenarios. It is text only field and is not mandatory. |
| PrimaryType | String | Defines a format for representing a message type (e.g., Email, FaxMessage, InstantMessage, VoiceMessage, MeetingRequest, etc.) associatd with the message. The message type will imply behavior of the message. Applications can |

TABLE 2-continued

| Field Name | Field Data Type | Field Description |
|---|---|---|
| | | customize icons and read custom headers based on the message type. This value can come from the X-MessageType header. |
| Priority | Int16 | Defines a format for representing a message priority for the message. Message priority for delivery as set by application. Values: AboveNormal = 3, Normal = 2, BelowNormal = 1. Higher values indicate that a transport should deliver it sooner than messages of a lower level. |
| ReadReceipt Requested | Boolean | Defines a format for indicating if read receipt has been requested for this message. |
| SendStatus | String | Defines a format for representing a send status of the message. "ToSend": Compose UI marks this way for transports to pick up. "Sending": A transport transitions from "ToSend" to "Sending" so other transports won't also attempt to send the message. "Sent": The transport transitions from "Sending" to "Sent" after the send is complete. |
| Sensitivity | String | Defines a format indicating the message sender's opinion of the sensitivity of the message. Corresponds with the "Sensitivity:" field in SMTP. Possible values are: None (no special sensitivity), Personal, Private, or Company-Confidential. The default value for new messages is None. |
| Size | Int64 | Defines a format for representing the calculated size of the message in bytes. This includes the entire message with body, header and attachments. The value can be missing if the size is unknown. |
| Subject | String | Defines a format for representing the subject of the message. For example, one line that describes the topic of the message. This field is calculated from NormalizedSubject and SubjectPrefix. Subject of the message. Subject can be computed from the Subject and SubjectPrefix values in the following manner: (1) If SubjectPrefix is present, Subject is set to the contents of the NormalizedSubject with the prefix prepended. (2) If SubjectPrefix is not present, NormalizedSubject is copied to Subject. |
| SubjectPrefix | String | Defines a format for representing a SubjectPrefix of the message. Consists of one or more alphanumeric characters, followed by a colon and a space (which are part of the prefix). The subject prefix may be absent. If SubjectPrefix is set express;y, it can be of any length and use any alphanumeric characters and can match a substring at the beginning of the subject. If SubjectPrefix is not expressly set and must be computed by, its contents can be more restricted. One possible rule for computing the prefix is that the subject begin with one, two, or three letters (alphabetic only) followed by a colon and a space. If such a substring is found at the beginning of the subject, it then becomes SubjectPrefix (and also stays at the beginning of the Subject field). Otherwise SubjectPrefix remains unset. |
| TimeDownloaded | DateTime | Defines a format for representing the date and time the message was downloaded from the server. |
| TimeReceived | DateTime | Defines a format for representing the date and time the message was delivered. The TimeReceived property describes the time the message was received by the server, rather than the time the message was downloaded from the server and placed in the local WinFS store. This value can be omitted on draft messages and retained copied of send messages. |
| TimeSent | DateTime | Defines a format for representing the date and time the message sender submitted the message. On draft messages this value can be omitted —it will be set when the message is submitted. |
| Attachment Message | Attachment | Defines a format for representing a link to attachment data corresponding to the message. The attachment data can be defined in accordance with an attachment schema. |
| MessageContents | ContentsData | Defines a format for representing link to a portion of message content corresponding to the message. The portion of message content can be defined in accordance with a content schema. |

TABLE 2-continued

| Field Name | Field Data Type | Field Description |
| --- | --- | --- |
| MessageOriginal DeliveryAccount | OriginalDelivery AccountData | Defines a format for representing a link to original delivery account data corresponding to the message. The original delivery account data can be defined in accordance with an account schema. |
| Message Participants | ParticipantsData | Defines a format for representing a link to contact data corresponding to the message. Contact data can be defined in accordance with a contact schema. The contact data can represent a collection of users who participated in the message exchange. This includes, senders, receivers, people copied (Cc), etc. A participant is a link to the Contact Item representing message sender/receiver. May be left dangling in which case the fields on this type contain all the necessary data about the participant. |
| MessageSentMessage Folder | SentMessage FolderData | Defines a format for representing a link to a folder item corresponding to the message. The folder item can be defined in accordance with a Folder Schema. This field specifies a link to a folder the message can be moved to after being submitted for delivery. |

Depicted in FIG. 2, schema hierarchy 200 includes contact schema 214. Contact schema 214 includes interrelated fields 215 that define data formats for representing a contact item. A message item defined in accordance with message schema 212 can include a link to a contact item defined in accordance with contact schema 214. A participant can be a link to a contact item representing a message sender, receiver, etc. A participant link may be left dangling in which case the fields on this type contain all the necessary data about the participant. More specifically, interrelated fields 215 can define data formats as described in Table 3.

formats for representing address, telephone number, display name, and image data associated with a contact. Contact schema 214 can also include or link to interrelated fields for representing potentially real-time contact status data, such as, for example, whether a contact is in or out of the office, at lunch, busy, available, etc. An external application, for example, a scheduling application may access a contacts silo to change contact status data.

Depicted in FIG. 2, schema hierarchy 200 includes folder schema 220. Folder schema 220 includes interrelated fields 221 that define data formats for representing a folder item. A

TABLE 3

| Field Name | Field Data Type | Field Description |
| --- | --- | --- |
| EAddress | EAddress | Defines a format representing one or more electronic addresses corresponding to a message participant. This field can represent electronic addresses of the message participant (e.g., of a message defined in accordance with a message schema). It is used for User name and address information. It is omitted for private DLs case. It is multivalued for legacy DN case. A contact can include multiple EAddress fields. |
| GroupID | GUID | Defines a format for representing a participant group identifier. This field can support RFC 2822 recipient group syntax. This is a way to group recipients to a specific display name including handling two groups with the same name. |
| Order | Int32 | Defines a format for representing an order corresponding to the participant. User interfaces can take this value into consideration when displaying the order of the participants to the user. |
| Type | String | Defines a format for representing a type of entity corresponding to the participant (individual, organization, and corporation). This is a free form string as people can add other values here. |
| Usage | String | Defines a format for representing the participants usage of a message. Possible Values: From, To, Cc, Bcc, Sender, ReplyTo, ReceivedRepresenting, TransportSender. It can also contain other values. An application is not required to understand all kinds of values for this field. Some may apply only to Email, some only to IM messages, etc. |
| DeliveryReceipt Request | Boolean | Defines a format for indicating if delivery receipt has been requested for the participant. |

Contact schema 214 can also include or link to other additional interrelated fields that define formats for representing other additional contact related data. For example, contact schema 214 can include or link to interrelated fields defining message item defined in accordance with message schema 212 can include a link to an folder item defined in accordance with folder schema 220. More specifically, interrelated fields 221 can define data formats as described in Table 4.

TABLE 4

| Field Name | Field Data Type | Field Description |
|---|---|---|
| CanCreateChildren | Boolean | Defines a format for indicating if a folder can include child folders. A server may not want or permit the folder to have child folders. IMAP indicates this by returning '\Noinferiors' in the named attributes for the IMAP LIST response. |
| CustomType | String | Defines a format for representing a custom type corresponding to the folder. This contains a GUID or other custom type uniquely identifying the type of folder. This can be used for "SpecialOffers", "Errors", "PreProcessing", or other custom folder indicators that occur to frequently to be added to the Type category. |
| Description | String | Defines a format for represent a description of the folder. |
| DisplayName | String | Defines a format for representing a display name of the folder. The Name of the folder can be unique among it's peers but the DisplayName doesn't have database code to require that it be unique. |
| Size | Int64 | Defines a format for representing the calculated size of the folder in bytes. This can includes the entire body, header and attachments of message in the folder. If omitted the size is unknown. |
| SynchronizationType | String | Defines a format for representing how folder is synchronized. Most frequently used for IMAP, NNTP, and DAV accounts. Values: All: Synchronize the folder completely. Headers: Synchronize the headers New: Synchronize new items. |
| TotalCount | Int32 | Defines a format for representing the total number of messages in the folder. |
| Type | String | Defines a format for representing a special designation since some folders can be treated in a special way. For example, a RemoteRoot should not have more than one InboxPrimary. However, it can have more than one Inbox. Values: [These can map to a folder that is the root of an email account.] 1) RemoteRoot: This folder and it's children map 1 to 1 to an account that mirrors folders and messages from the server. (Example: IMAP) 2) LocalRoot: A folder that doesn't map 1-to-1 to an account that mirrors folders and messages from the server. [These can map to a folder that is the root of an email account.] 3) Inbox: This folder is designated as being the "Inbox". 4) Outbox: This folder is designated as being the "Outbox". 5) Sent: This folder is designated as being the "Sent". 6) Deleted: This folder is designated as being the "Deleted". 7) Drafts: This folder is designated as being the "Drafts". 8) Junk: This folder is designated as being the "Junk". |
| UnreadCount | Int32 | Defines a format for representing the number of unread messages in the folder. This accounts only for the Message items in this folder. |
| Account | AccountData | Defines a format for representing a link to account data. Account data can be defined in accordance with an Account schema. |

Folder schema 220 can also include or link to other additional interrelated fields that define formats for representing an application that has primary control of a folder.

Figure 3:
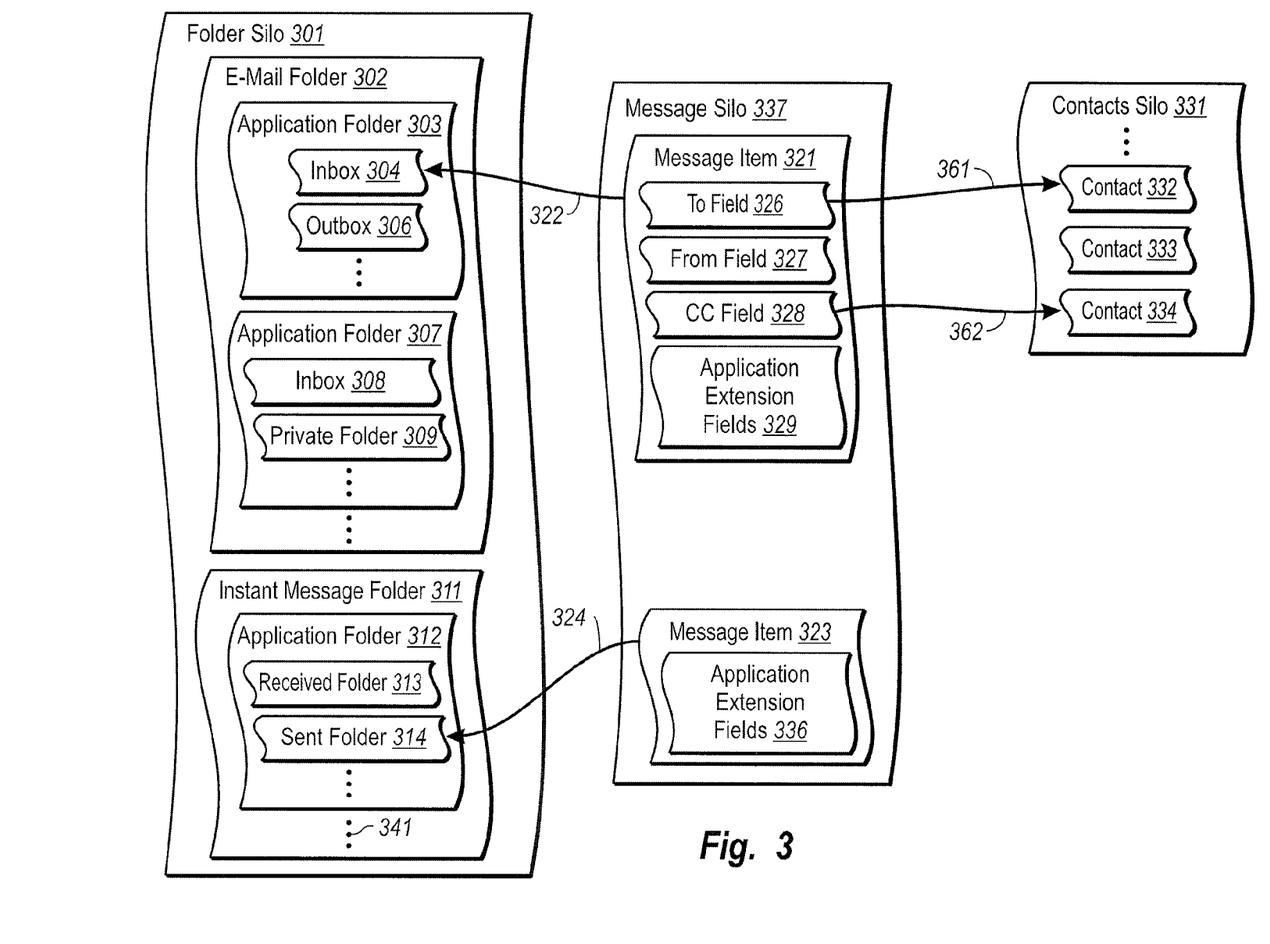
FIG. 3 illustrates an example of an items stored in a database in accordance with the principles of the present invention.

FIG. 3 illustrates an example of an items stored in a database in accordance with the principles of the present invention. Folder silo 301, message silo 337, and contacts silo 331 can be portions of an item database, such as, for example, database 114. The folders, message items, and contacts in FIG. 3 can be formatted in accordance with appropriate schemas of schema hierarchy 150 (or of example portion of a more detailed schema hierarchy 200). For example, E-mail folder 302 can be formatted in accordance with folder schema 220, message item 321 can be formatted in accordance with message schema 212, and contact 332 can be formatted in accordance with contact schema 214.

When a message item is received at computer system 109, the message item can be linked to a folder in a folder silo. A link from a message item to a folder represents that the message item is stored in the folder. For example, link 324 represents that message item 321 (e.g., an instant message) is stored in sent folder 314. A message item can include links to a plurality of different folders. Thus, a message item may be presented at a user-interface as being stored in a plurality of different folders.

Computer system 109 can determine the folder that is to receive an electronic message based in part on the primary type of the message (e.g., fax, blog entry, instant message, etc.) and/or application extension fields of the electronic message. For example, if message application folder 303 is registered to receive message items for a Eudora™ electronic mail application and application extension fields 329 indicate that message item 321 is a Eudora™ electronic mail application message, message item 321 can be linked to inbox 304. Similarly, application extension fields 336 can indicate that message item 323 is a specified type of instant message.

A folder silo can be arranged hierarchically. For example, folder silo 301 includes e-mail folder 302 and instant message folder 311. Vertical ellipsis 341 represents that additional folders for other types of electronic messages such as, for example, fax messages, blog entries, and news group postings, etc, can also be included in folder silo 301. E-mail folder 302 further includes application folder 303. Application folder 303 can represent a folder space is registered to a specified message application. For example, application folder 303 can be registered to message application 108. Operating system 111 can maintain registration data indicating which message applications have primary control over specified message folders. Registrations data can be contained in a folder silo or stored external to a folder silo. For example, operating system 111 may maintain a list of message applications and corresponding folders in system memory or a storage device computer system 109.

Registration of a folder space indicates that a registering application has primary control over the message items stored in the folder. For example, message application 108 can have primary control over message items stored in application folder 303 (and stored in sub-folders of application folder 303, such as inbox 304 and outbox 306). Accordingly, operating system 111 can prevent message applications other than message application 108 from accessing application folder 303. Alternately, operating system 111 can allow other message applications to access application folder 303 in accordance with rules specified by message application 108. For example, message application 108 can specify data formats (e.g., defined in accordance with a message application extension) that are to be adhered to when accessing application folder 303.

Similarly, other folders in a folder hierarchy can be registered to other message applications. For example, application folder 307 can be registered to message application 104. Accordingly, message application 104 can have primary control over message items stored in application folder 307 (and stored in sub-folders of application folder 307, such as inbox 308 and private folder 309). Likewise, application folder 312 can be registered to message application 106. Accordingly, message application 106 can have primary control over message items stored in application folder 312 (and stored in sub-folders of application folder 307, such as received folder 313 and send folder 314.

Message items can include links to contact items associated with message participants. A computer system can select a link to a contact item to access contact related data. It may be that a received electronic message includes one or more fields containing message participant identifiers (e.g., phone numbers, electronic mail address, instant message numbers, etc). For example, message item 321 includes To field 326, From field 327, and CC field 328, that can each contain one or more electronic mail addresses. Selection of an icon or hyperlink representing a link to a contact item can return contact related data. For example, link 361 can be selected to provide contact related data for a message participant identified in To field 326. Similarly, link 362 can be selected to provide contact related data for a message participant identified in CC field 328.

Figure 4:
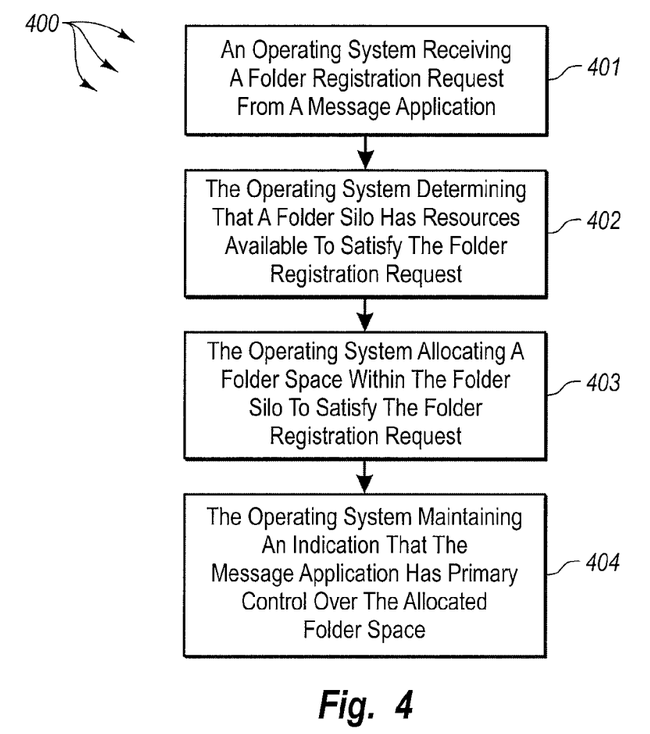
FIG. 4 illustrates an example flowchart of a method for registering for a folder space in accordance with the principles of the present invention.

FIG. 4 illustrates an example flowchart of a method 400 for registering for a folder space in accordance with the principles of the present invention. The method 400 will be described with respect to the components of network architecture 100 and the data structures of FIG. 3. When a message application is to attempt to register for a folder space, the message application sends a registration request to a module that monitors access to a folder silo. For example, message application 104 can send registration request 191 to operating system 111 to register for a folder space in folder silo 183.

The method 400 includes an act of an operating system receiving a folder registration request from a message application (act 401). Act 401 can include a computer system receiving a folder registration request from a message application. For example, operating system 111 can receive registration request 191 from message application 104.

The method 400 includes an act of the operating system determining that a folder silo has resources available to satisfy the folder registration request (act 402). Act 402 can include a computer system determining that a folder silo has resources available to satisfy the folder registration request. For example, operating system 111 can determine that folder silo 301 has resources available to satisfy to satisfy folder registration request 191. Operating system 111 can analyze the current arrangement of message silo 301 (or refer to an external list) to determine that no other message application is currently registered for the requested folder name space. For example, operating system 111 can determine that no message application has registered to receive instant messages defined in accordance with a specified message application extension. When a folder space is already registered, operating system can return an appropriate signal to message application 104.

The method 400 includes an act of the operating system allocating a folder space within the folder silo to satisfy the folder registration request (act 403). Act 403 can include a computer system allocating a folder space within the folder silo to satisfy the folder registration request. For example, operating system 111 can allocate folder 179 to message application 104 to satisfy registration request 191. Operating system 111 can send folder allocation command 192 to database 114. In response to folder allocation command 192, database 114 can allocate folder 179 to message application 104. Operating system 111 (and/or database 114) may also create an application folder, for example, when the application folder does not all ready exist. For example, operating system 111 (and/or database 114) can create and insert folder 179 into folder silo 183.

The method 400 includes an act of the operating system maintaining an indication that the message application has primary control over the allocated folder space (act 404). Act 404 can include a computer system maintaining an indication that the message application has primary control over the allocated folder space. For example, operating system 111 can maintain an indication that folder 179 is allocated to message application 104. Operating system 111 can alter the arrangement of folder silo 183 (or update an external list) such that subsequent analysis of folder silo 183 (or the external list) indicates folder 179 is registered to message application 104. Operating system 111 can z<return an appropriate signal to message application 104 indicating that folder 179 has been registered to message application 104.

Subsequent requests to access folder items and message items in database 114 may be routed through operating system 111. Accordingly, operating system 111 can potentially prevent inappropriate access to folders. For example, when a request to access a folder is received from a message application that does not have primary control over a folder and/or that is of an incompatible (or potentially destructive) data format, operating system 111 can prevent access to the folder. Accordingly, the possibility of data corruption is reduced. That is, it is unlikely an application would be allowed to access a folder in a manner that could damage a message item stored in the folder. For example, operating system 111 can prevent message application 108 from accessing folder 179

(and message items stored in folder 179 and corresponding sub-folders), when folder 179 is registered to message application 104.

Figure 5:
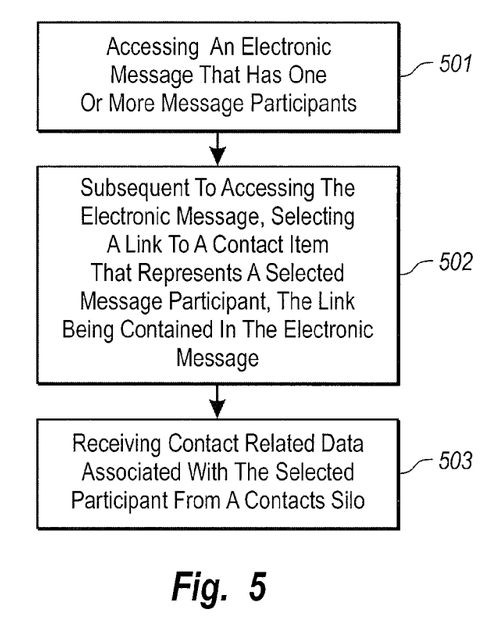
FIG. 5 illustrates an example flowchart of a method for accessing contact related data in accordance with the principles of the present invention.

FIG. 5 illustrates an example flowchart of a method for accessing contact related data in accordance with the principles of the present invention. The method of FIG. 5 will be described with respect to the components of network architecture 100 and the data structures of FIG. 3. The method of FIG. 5 includes an act of accessing an electronic message that has one or more message participants (act 501). Act 501 can include a computer system accessing an electronic message that has one more message participants. For example, message application 106 can access message item 197 from computer system 109. Message item 197 can be a message stored in message silo 184 and represented in accordance with message schema 152 (or message schema 212). Accordingly, message item 197 can include one or more participant identifiers identifying message participants. The included participant identifiers can represent links to contact items in contacts silo 186.

Message application 106 can include a user-interface for presenting electronic messages. Accordingly, message related data contained in message item 197 can be presented at the user-interface. Links to message participants can be presented as icons or hyperlinks.

The method of FIG. 5 includes an act of subsequent to accessing the electronic message, selecting a link to a contact item representing a selected message participant (act 502). Act 502 can include a computer system selecting a link to a contact item representing a selected message participant. For example, in response to user input received at message application 106 (e.g., through the user-interface), message application 106 can access a link to a contact item in contacts silo 186. Selecting a link can include utilizing a user input device, such as, for example, a mouse, to select icon or hyperlink (e.g., by "clicking" on the icon or hyperlink).

Selecting a link to a contact item can cause a computer system to send a contact related data request. For example, message application 106 can send contact related data request 194 to computer system 109. In response to receiving contact related data request 194, computer system 109 can execute a database access command to retrieve the appropriate contact related data. Computer system 109 can return retrieved contact related data to message application 106. For example, computer system 109 can send contact related data 195 (e.g., data from contact 174 and/or contact 176) to message application 106.

The method of FIG. 5 includes an act of receiving contact related data associated with the selected participant (act 503). Act 503 can include a computer system receiving contact related data associated with the selected participant. For example, message application 106 can receive contact related data 195 from computer system 109. Message application 106 can present contact related data through a user-interface. Accordingly, a user with knowledge of a participant identifier can utilize the participant identifier (e.g., by selecting or entering the participant identifier at a corresponding user-interface) to access more detailed contact related data.

It may be that message item 197 resides at computer system 102 for some time after it is initially received. From time to time a user of computer system 102 may view the contents of message item 197. Between the times the user views the contents of message item 197, contact related data for a message participant may change in contacts silo 182 (e.g., as a result of another application altering the contact related data). For example, a user may change addresses or telephones numbers causing the data fields values of a contact item to change. Since message item 197 links to contact silo 182 changes to contact related data can be efficiently reflected at message application 106. That is, selecting a link to a contact item in contacts silo 182 can cause current contact related information to be presented, even if the contact related information has changed since the last time the link was selected.

It may also be that a message item stores contact related data associated with a link between the message item and a contact item. For example, message item 197 can store contact related data associated with a link between message item 197 and contact 174. Thus, a received message item can provide access to contact related data stored in a contacts silo and can also provide access to contact related data stored in the message. For example, message item 197 can link to contact 174 and can also store contact related data associated with the link to contact 174.

Contact related data stored in a message item can be contact related data retrieved from a contact item at the time the message item was created. Thus, this contact related data can persist (since it is stored on the link from the message item to the contact item) even when the contact item is subsequently changed in a contacts silo. Accordingly, a recipient of a message item can access contact related data from the time the message item was created as well as accessing contact related data that has subsequently changed. Having access to contact related data from the date of message item creation and access to subsequently changed contact related data may enhance a recipient's ability to locate message items associated with a contact.

Figure 6:
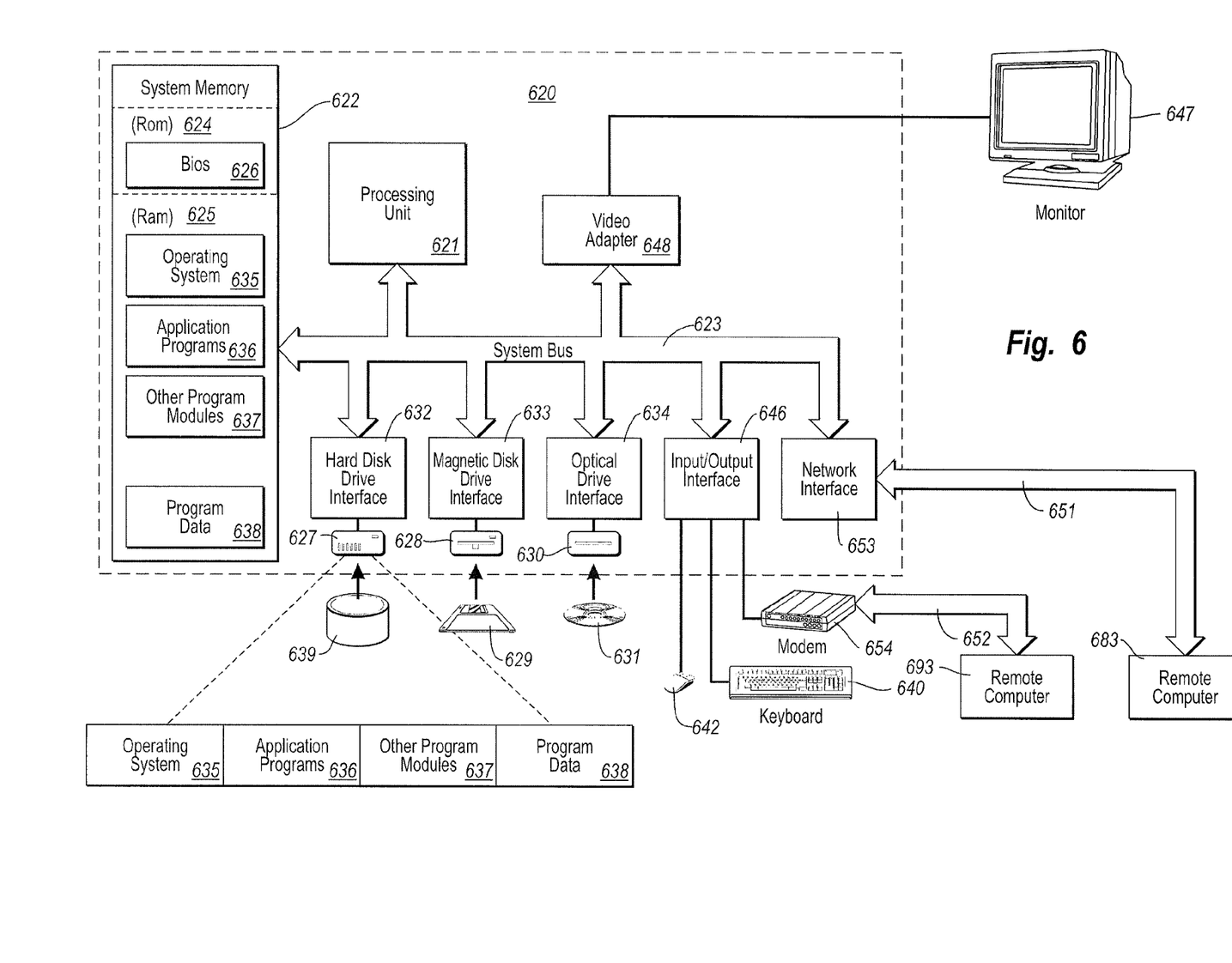
FIG. 6 illustrates a suitable operating environment for the principles of the present invention.

FIG. 6 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 6, an example system for implementing the invention includes a general-purpose computing device in the form of computer system 620, including a processing unit 621, a system memory 622, and a system bus 623 that couples various system components including the system memory 622 to the processing unit 621. Processing unit 621 can execute computer-executable instructions designed to implement features of computer system 620, including features of the present invention. The system bus 623 may be any of several types of bus structures including a memory bus or memory controller, a peripheral bus, and a local bus using any of a variety of bus architectures. The system memory includes read only memory ("ROM") 624 and random access memory ("RAM") 625. A basic input/output system ("BIOS") 626, containing the basic routines that help transfer information between elements within computer system 620, such as during start-up, may be stored in ROM 624.

The computer system 620 may also include magnetic hard disk drive 627 for reading from and writing to magnetic hard disk 639, magnetic disk drive 628 for reading from or writing to removable magnetic disk 629, and optical disk drive 630 for reading from or writing to removable optical disk 631, such as, or example, a CD-ROM or other optical media. The magnetic hard disk drive 627, magnetic disk drive 628, and optical disk drive 630 are connected to the system bus 623 by hard disk drive interface 632, magnetic disk drive-interface 633, and optical drive interface 634, respectively. The drives and their associated computer-readable media provide non-volatile storage of computer-executable instructions, data structures, program modules, and other data for the computer system 620. Although the example environment described herein employs magnetic hard disk 639, removable magnetic disk 629 and removable optical disk 631, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 639, magnetic disk 629, optical disk 631, ROM 624 or RAM 625, including an operating system 635, one or more application programs 636, other program modules 637, and program data 638. A user may enter commands and information into computer system 620 through keyboard 640, pointing device 642, or other input devices (not shown), such as, for example, a microphone, joy stick, game pad, scanner, or the like. These and other input devices can be connected to the processing unit 621 through input/output interface 646 coupled to system bus 623. Input/output interface 646 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 647 or other display device is also connected to system bus 623 via video interface 648. Speakers 669 or other audio output device is also connected to system bus 623 via audio interface 649. Other peripheral output devices (not shown), such as, for example, printers, can also be connected to computer system 620.

Computer system 620 is connectable to networks, such as, for example, an office-wide or enterprise-wide computer network, a home network, an intranet, and/or the Internet. Computer system 620 can exchange data with external sources, such as, for example, remote computer systems, remote applications, and/or remote databases over such networks.

Computer system 620 includes network interface 653, through which computer system 620 receives data from external sources and/or transmits data to external sources. As depicted in FIG. 1, network interface 653 facilitates the exchange of data with remote computer system 683 via link 651. Network interface 653 can logically represent one or more software and/or hardware modules, such as, for example, a network interface card and corresponding Network Driver Interface Specification ("NDIS") stack. Link 651 represents a portion of a network (e.g., an Ethernet segment), and remote computer system 683 represents a node of the network.

Likewise, computer system 620 includes input/output interface 646, through which computer system 620 receives data from external sources and/or transmits data to external sources. Input/output interface 646 is coupled to modem 654 (e.g., a standard modem, a cable modem, or digital subscriber line ("DSL") modem) via link 659, through which computer system 620 receives data from and/or transmits data to external sources. As depicted in FIG. 1, input/output interface 646 and modem 654 facilitate the exchange of data with remote computer system 693 via link 652. Link 652 represents a portion of a network and remote computer system 693 represents a node of the network.

While FIG. 6 represents a suitable operating environment for the present invention, the principles of the present invention may be employed in any system that is capable of, with suitable modification if necessary, implementing the principles of the present invention. The environment illustrated in FIG. 6 is illustrative only and by no means represents even a small portion of the wide variety of environments in which the principles of the present invention may be implemented.

In accordance with the present invention, message applications and common messaging interfaces as well as associated data, including schemas, message items, and message silos may be stored and accessed from any of the computer-readable media associated with computer system 620. For example, portions of such modules and portions of associated program data may be included in operating system 635, application programs 636, program modules 637 and/or program data 638, for storage in system memory 622.

When a mass storage device, such as, for example, magnetic hard disk 639, is coupled to computer system 620, such modules and associated program data may also be stored in the mass storage device. In a networked environment, program modules depicted relative to computer system 620, or portions thereof, can be stored in remote memory storage devices, such as, system memory and/or mass storage devices associated with remote computer system 683 and/or remote computer system 693. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computer system that includes one or more processors and that is network connectable along with one or more other computer systems to a network, a method for updating contact related data, the method comprising:

an act of the computer system receiving an electronic message that has one or more message participants, the electronic message storing first contact information for each of the one or more message participants, the first contact information comprising initial contact information associated with each of the one or more message participants at a time when the electronic message was created;

an act of the computer system, subsequent to receiving the electronic message, generating a user interface that presents the electronic message to a user, the user interface including one or more visual links for retrieving contact information for a corresponding message participant selected from the one or more message participants;

an act of the computer system, subsequent to generating the user interface, receiving user input selecting a visual link from the one or more visual links, the visual link corresponding to a selected contact item that represents a selected message participant and that is stored at least at a remote contacts silo;

an act of the computer system, in response to receiving user input selecting the visual link, sending a contact related data request to a remote computer system to retrieve second contact information associated with the selected contact item stored at the remote contacts silo;

an act of the computer system receiving the second contact information associated with the selected message participant from the contacts silo, the second contact information representing updated contact information for the selected message participant that was updated at the remote contacts silo subsequent to the time when the electronic message was created; and an act of the computer system storing at least a portion of both the first contact information and the second contact information, such that the user has concurrent access to the initial contact information from the time the electronic message was created, as well as the updated contact information that was updated at the remote contacts silo subsequent to the time when the electronic message was created.

2. The method as recited in claim 1, wherein the act of accessing an electronic message that has one or more message participants comprises an act of accessing an electronic mail message.

3. The method as recited in claim 1, wherein the act of accessing an electronic message that has one or more message participants comprises an act of accessing an electronic message of a specified primary type.

4. The method as recited in claim 1, wherein the act of accessing an electronic message that has one or more message participants comprises an act of accessing an electronic message having one or more fields defined in accordance with a message application extension schema.

5. The method as recited in claim 1, wherein the act of receiving user input selecting a visual link corresponding to a selected contact item that represents a selected message participant comprises an act of selecting a hyperlink that represents a link to the selected contact item.

6. The method as recited in claim 1, wherein the act of receiving user input selecting a visual link corresponding to a selected contact item that represents a selected message participant comprises an act of selecting an icon that represents a link to the selected contact item.

7. The method as recited in claim 1, wherein the act of receiving user input selecting a visual link corresponding to a selected contact item that represents a selected message participant comprises an act of selecting a link that represents a defined relationship between a message item and a contact item, the represented relationship being defined in accordance with a schema hierarchy.

8. The method as recited in claim 1, wherein the act of receiving user input selecting a visual link corresponding to a selected contact item that represents a selected message participant comprises an act of selecting a participant identifier, the participant identifier being selected from among an electronic mail address, a telephone number, and an instant message identifier.

9. The method as recited in claim 1, wherein the act of receiving the second contact information associated with the selected message participant comprises an act of receiving real-time data from the remote contacts silo, including real-time data related to present availability of the selected message participant.

10. The method as recited in claim 1, further comprising:
an act of the computer system presenting the first contact information and the second contact information at a messaging application so as to enhance the user's ability to locate other message items received from the selected message participant.

11. One or more computer storage devices having stored thereon computer executable instructions that, when executed by at least one processor of a computer system, cause the computer system to perform a method, comprising:
a computer system receiving an electronic message that has one or more message participants and that stores first contact information for the one or more message participants from a time when the electronic message was created, the computer system including at least one processor;
subsequent to receiving the electronic message, the computer system receiving user input via a user interface, the user input selecting a visual link corresponding to a selected contact item that represents a selected message participant selected from the one or more message participants, the selected contact item stored at a remote contacts silo that is separated from the computer system;

in response to receiving the user input, the computer system sending a contact related data request to a remote computer system to retrieve second contact information associated with the selected contact item stored at the remote contacts silo;

the computer system receiving the second contact information associated with the selected message participant from the contacts silo, the second contact information representing updated contact information for the selected message participant that was updated at the remote contacts silo subsequent to the time when the electronic message was created, the updated contact information including real-time data related to present availability of the selected participant; and the computer system retaining at least a portion of the first contact information and storing at least a portion of the second contact information, such that the user has concurrent access to at least a portion of the initial contact information from the time the electronic message was created, as well as the updated contact information that was updated at the remote contacts silo subsequent to the time when the electronic message was created.

12. A computer system comprising:

at least one processor; and one or more computer storage devices having stored computer-executable instructions that, when executed by the at least one processor, cause the computer system to perform a method, comprising:

the computer system receiving an electronic message that has one or more message participants;

the computer system storing first contact information for each of the one or more message participants, the first contact information comprising initial contact information associated with each of the one or more message participants at a time when the electronic message was created;

subsequent to receiving the electronic message, the computer system receiving user input selecting a link corresponding to a selected contact item that represents a selected message participant selected from the one or more message participants, the selected contact item stored at least at a remote contacts silo which is remote from and distinguished from the electronic message, the link being contained in the electronic message and corresponding to the selected contact item stored at the remote contacts silo;

the computer system sending a contact related data request to a remote computer system to retrieve second contact information associated with the selected contact item stored at the remote contacts silo;

the computer system receiving the second contact information associated with the selected message participant from the contacts silo, the second contact information representing updated contact information for the selected message participant that was updated at the remote contacts silo subsequent to the time when the electronic message was created; and the computer system storing at least a portion of the second contact information, such that the user has concurrent access to the stored first contact information from the time the electronic message was created, as well as the stored second contact information that was updated at the remote contacts silo.

13. The method as recited in claim 9, wherein the act of receiving real-time data from the remote contacts silo comprises receiving real-time data related to one or more of whether the selected message participant is in or out of an office, at lunch, busy, or available.

14. The method as recited in claim 1, wherein the selected contact item exists at the remote contacts silo when the computer system accesses the electronic message.

15. The method as recited in claim 1, wherein the act of generating the user interface that presents the electronic message to the user comprises displaying at least a portion of the first contact information.

16. The method as recited in claim 15, further comprising:
an act of the computer system, subsequent to receiving the second contact information, updating the user interface to present the electronic message to the user while displaying at least a portion of the first contact information and at least a portion of the second contact information.

\* \* \* \* \*